United States Patent [19]

Watson

[11] 4,257,398
[45] Mar. 24, 1981

[54] HIGH EFFICIENCY SOLAR COLLECTOR

[76] Inventor: W. Keith R. Watson, El Camino Real (Box 1547), Rancho Santa Fe, Calif. 92067

[21] Appl. No.: 23,536

[22] Filed: Mar. 26, 1979

[51] Int. Cl.³ .............................................. F24J 3/02
[52] U.S. Cl. ................................. 126/427; 126/445; 126/448; 165/DIG. 2
[58] Field of Search ................. 165/135, DIG.2; 126/442, 445, 444, 447, 448, 427, 417, 450

[56] References Cited

U.S. PATENT DOCUMENTS

| | | | |
|---|---|---|---|
| 1,916,888 | 7/1933 | Malott | 165/135 |
| 3,981,294 | 9/1976 | Deminet et al. | 126/445 |
| 4,049,046 | 9/1977 | Worthington | 126/444 |
| 4,074,706 | 2/1978 | Hajdu et al. | 126/447 |
| 4,083,358 | 4/1978 | Scott | 126/448 |
| 4,098,262 | 7/1978 | Peters | 126/444 |
| 4,099,338 | 7/1978 | Mullin | 126/427 |
| 4,113,004 | 9/1978 | Rush et al. | 126/427 |
| 4,138,993 | 2/1979 | Conley | 126/447 |
| 4,150,657 | 4/1979 | Bowen | 126/447 |
| 4,150,661 | 4/1979 | Callegari et al. | 126/445 |

Primary Examiner—James C. Yeung
Assistant Examiner—Daniel O'Connor
Attorney, Agent, or Firm—William W. Haefliger

[57] ABSTRACT

High efficiency solar collector apparatus heats throughput liquid or fluid to relatively high temperature.

14 Claims, 11 Drawing Figures

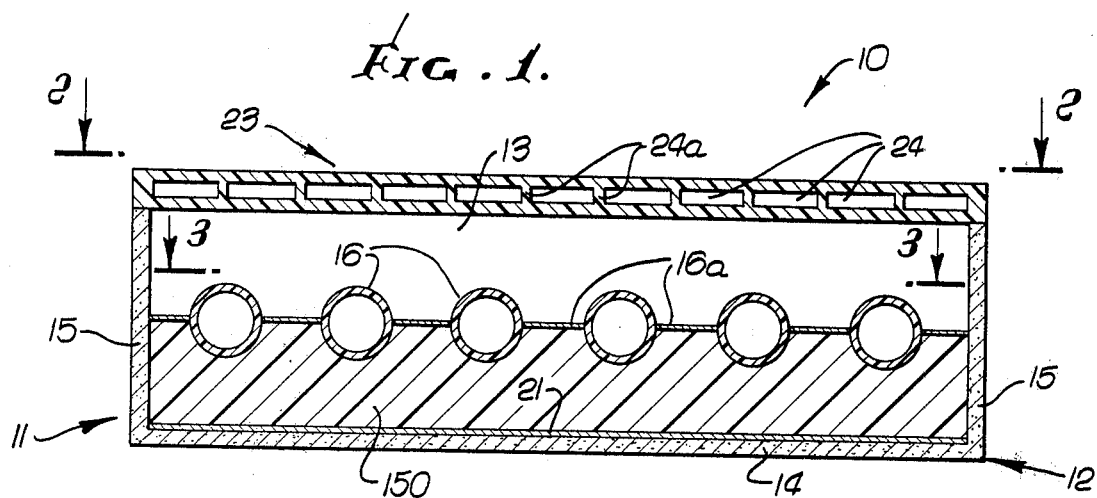
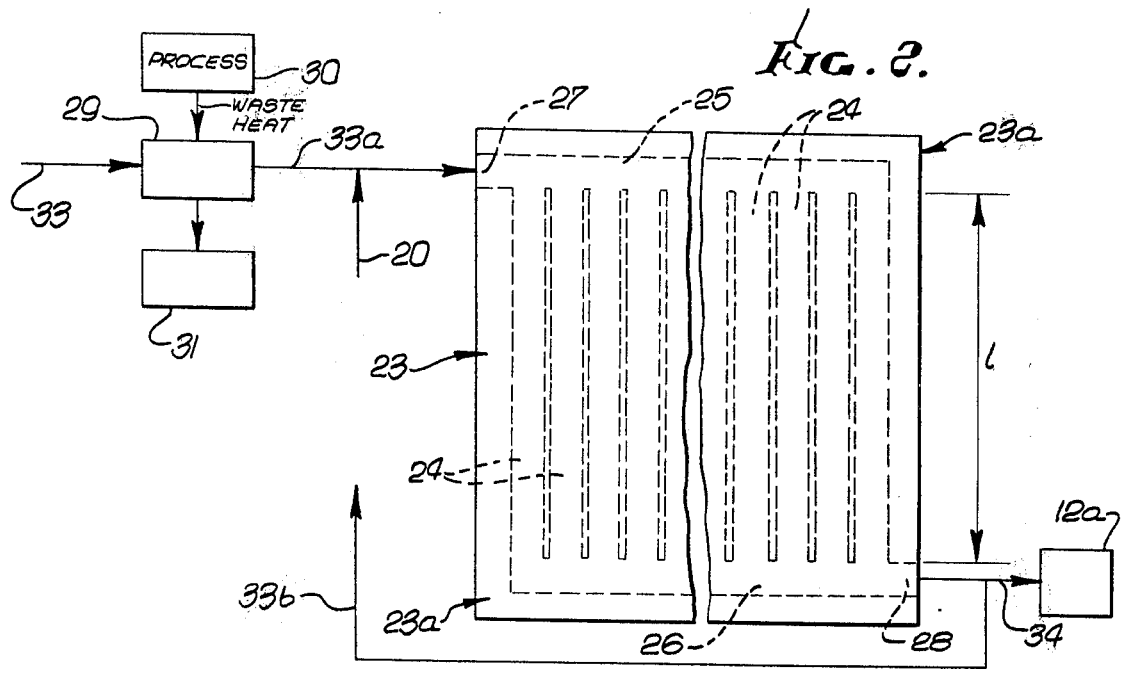
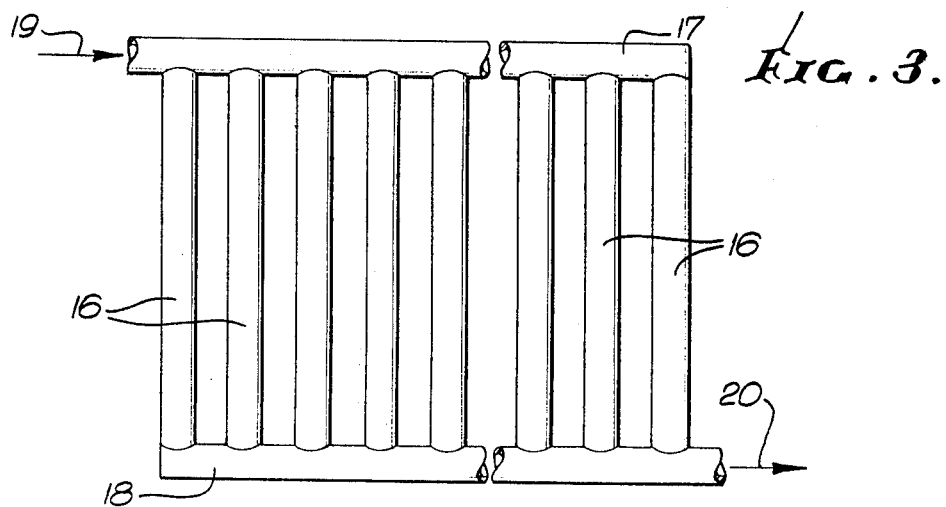

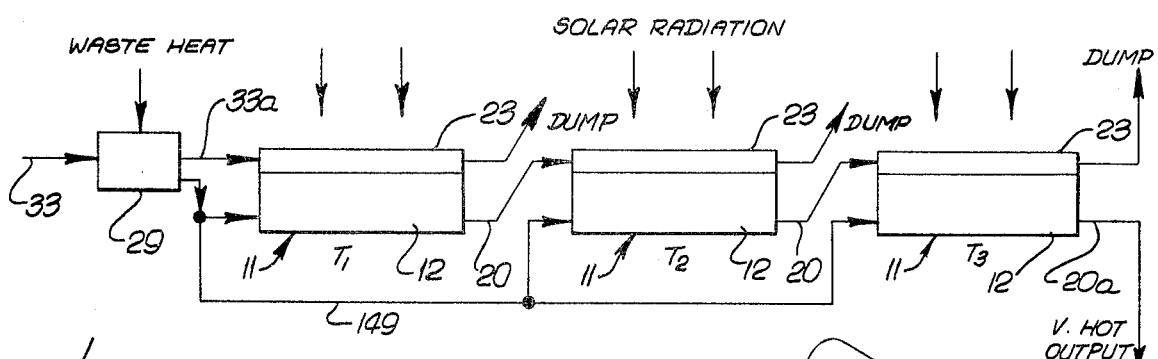
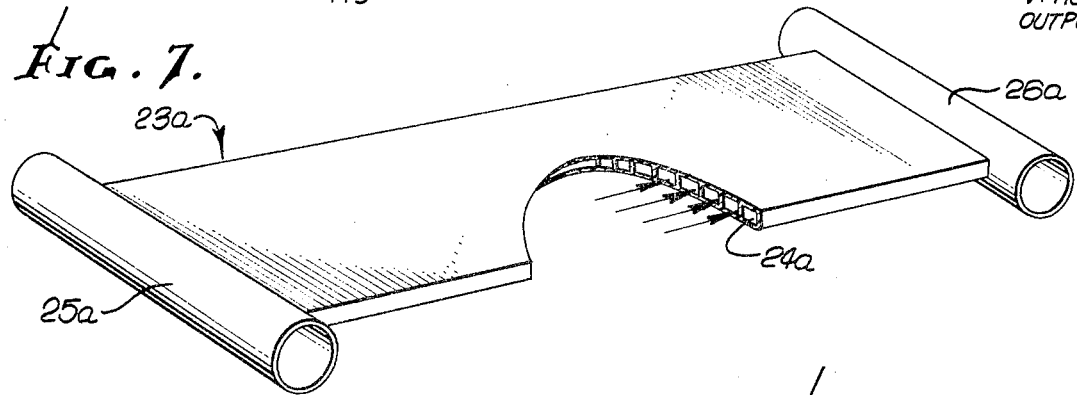
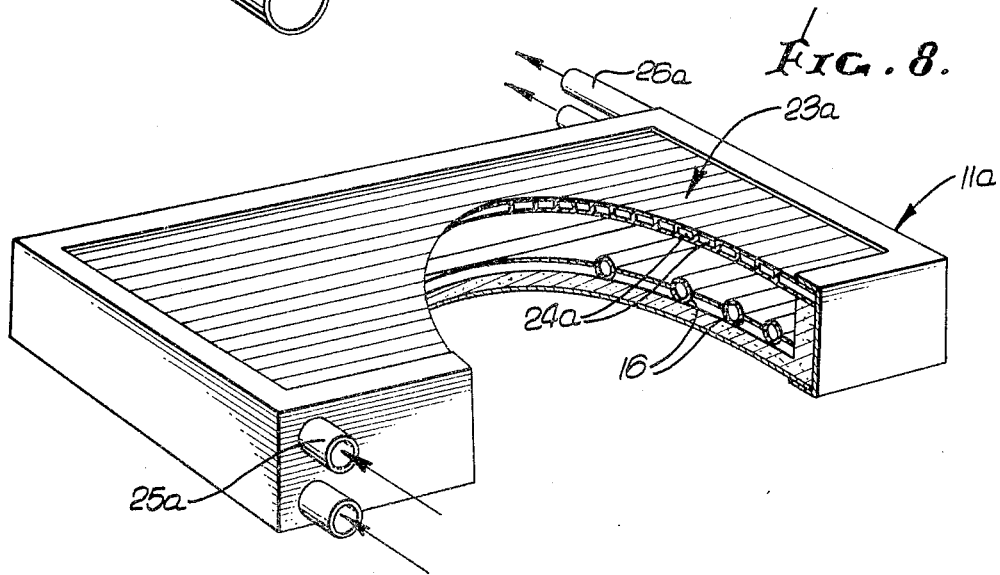
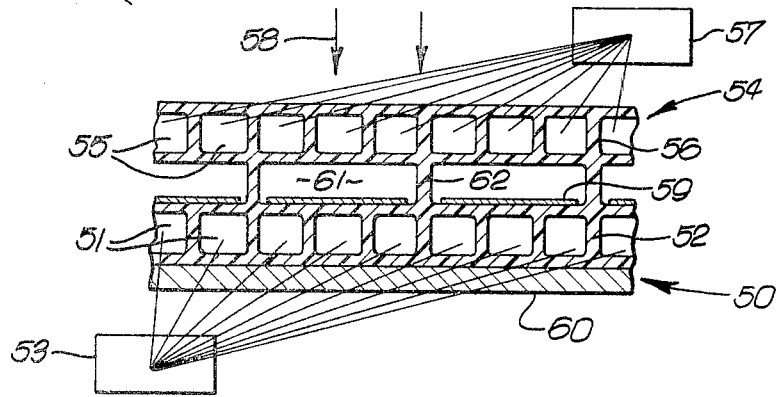

HIGH EFFICIENCY SOLAR COLLECTOR

BACKGROUND OF THE INVENTION

This invention relates generally to conversion of solar energy to usable energy. More specifically, it concerns highly efficient solar collector apparatus characterized as heating throughput liquid to very high comparative temperatures.

In the past, low cost solar collectors were undesirably limited in their abilities to heat throughput liquids to desired temperatures. For example, simple flat plate collectors could not operate efficiently to produce throughput liquid temperatures approaching 100° C. Also, flat plate collectors have relatively low efficiency because they conduct, convect and radiate through the cover plate to a temperature determined by ambient. Accordingly, there is a need for simple means to enable low cost collectors to operate at much higher temperatures, and higher efficiencies.

SUMMARY OF THE INVENTION

It is a major object of the invention to provide a solution to the above outlined problem. Basically, the invention is realized through the provision of means operable to raise the ambient temperature at the solar input side of a collector, and which passes solar radiation into the collector. Typically, and in accordance with the invention, such means covers the solar input side of a collector and contains channel structure through which transparent or translucent heated flowable media is adapted to pass. As will be seen, such location of the heated flowable media at the solar radiation inlet side of the collector operates to raise the ambient temperature of the collector interior to a level corresponding to the heated condition of the media in the channel structure, and correspondingly serves to increase the outflow temperature of liquid passed through the collector ducting. That outflow temperature is substantially higher than the outflow temperature from a similar collector lacking the ambient temperature raising means of the invention, for a given operating efficiency. Thus, very hot water or steam may be produced and used as for example in a multiple effect solar still, or a flash evaporator, or as a source of distilled water as in secondary recovery of waste water. Liquids other than water may be heated to very high temperatures.

Additional objects of the invention include the compounding of the ambient temperature means in a collector to further raise the outflow temperature, the use of multiple collectors with the heated outflow from each collector passed to the transparent channel structure of another collector to secure successive temperature increases; and the operation of such collectors in conjunction with waste heat sources so as to increase solar collector efficiencies.

These and other objects and advantages of the invention, as well as the details of illustrative embodiments, will be more fully understood from the following description and drawings, in which:

DRAWING DESCRIPTION

FIG. 1 is a vertical section through solar apparatus incorporating the invention;
FIG. 2 is a plan view on lines 2—2 of FIG. 1;
FIG. 3 is a plan view on lines 3—3 of FIG. 1;
FIG. 4 is a fragmentary vertical section showing modified apparatus incorporating the invention;
FIG. 5 is a graph;
FIG. 5a is a graph;
FIG. 6a illustrates multiple solar collectors connected in series in accordance with an aspect of the invention; and
FIG. 6b illustrates a modification, and
FIGS. 7–9 show modified collectors incorporating the invention.

DETAILED DESCRIPTION

Figure 4:
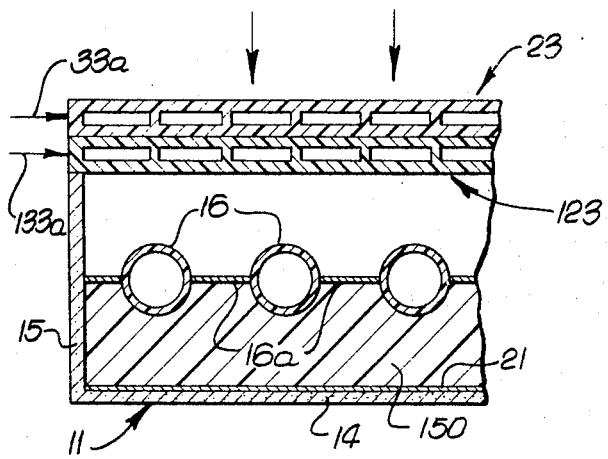

The solar apparatus 10 shown in FIG. 1 includes a solar collector 11 comprising an enclosure 12 open at one side 13 through which solar radiation enters the collector. Merely as illustrative, the enclosure 12 includes a thermally insulated bottom wall 14 and side walls 15, such walls typically being heat insulative. Suitable materials include glass fibers and polymer foam. Liquid conduit or ducting stretches 16 extend in spaced relation within the collector, and may be connected to manifolds 17 and 18. Stretches 16 may be defined by an absorber plate which may be blackened. Liquid such as water enters manifold 17 at 19, flows therealong and through the conduit stretches 16, and then flows through the manifold 18 to exit at 20, such liquid being heated in the collector and having an exit temperature $T_0$. The stretches and manifolds may consist of plastic, metal or other material having darkened or selective radiation absorbing outer surfaces. If desired, a radiation reflective material such as aluminum foil may be placed at 21 along the inner side of the bottom wall of the enclosure. Copper or aluminum sheet 16a joins conduits 16. Other forms of collector apparatus may also be provided. Insulation 150 may be used, as shown.

In accordance with the invention, the solar apparatus includes means operable to raise the ambient temperature at side 13, i.e. in the vicinity of the solar heated conduit stretches 16 or absorber plate; further that means typically defines channel structure through which heated flowable media is adapted to pass, such media passing solar radiation therethrough. In the example, the described means typically includes a transparent sheet 23 extending at and over the air or gas filled open side 13 of the collector enclosure, the sheet defining internal channel structure in the form of multiple channels or ducts 24. These may extend in parallel relation as seen in FIG. 2, and may connect with header ducts or channels 25 and 26. The walls 24a separating the channels are thin compared with the widths of the channels, so that a virtually continuous channeling 24 extends across the side 13 of the enclosure 12. See also a corresponding modified structure shown at 23a in FIG. 7, with headers 25a and 26a and ducts 24a. A complete assembly corresponding to that shown in FIG. 1 appears at 11a in FIG. 8.

Heated flowable media, as for example hot water or other liquid, enters header 25 at 27, flows through the header 25, ducts 24 and header 26, to exit at 28. Sheet 23 typically consists of transparent or translucent plastic material, one example being the commercial product known as twin-wall "TUFFAK", a one-piece polycarbonate plastic extrusion sold by Rohm and Haas, and produced in Italy. The sheet 23 may consist of a UV-stabilized polycarbonate such as "LEXAN" or "MERLON", or a material such as "PLEXIGLAS". That extrusion may have length "l" in FIG. 2, and auxiliary sheets 23a defining headers 25 and 26 may be bonded to the end of the extrusion to define the complete sheet.

The fluid media entering sheet 23 at 27 may be preheated as by waste heat produced by a commercial or other process 30; for example, water is fed at 33 to a heat exchanger 29 (which may be of counterflow type) wherein it is heated and fed at 33a to the sheet entrance 27. The waste heat, after passing through the heat exchanger 29, is then discharged or otherwise utilized as in a waste heat recovery unit 31 or other apparatus, or is vented. Water or fluid media leaving the sheet 23 at 28 may be returned at 33b to pass again through the heat exchanger 29 and through the sheet 23. Alternatively, the heated media leaving the sheet at 28 may be fed at 34 to another collector 12a to pass through its tubing stretches (or absorber plate) as for example similar to those described at 16 above; or, device 12a may represent another utilization apparatus. The source of the water or fluid (liquid or gas) feed at 33a may be the heated outflow from the ducting 17, 16 and 18 in another collector 12, as represented by feed line 20 in FIG. 2, whereby great efficiency is realized, the objective being to raise the efficiency of the solar collector apparatus to a comparatively high value, i.e. compared with the efficiency of a collector which lacks the described means that typically includes sheet 23.

Figure 5:
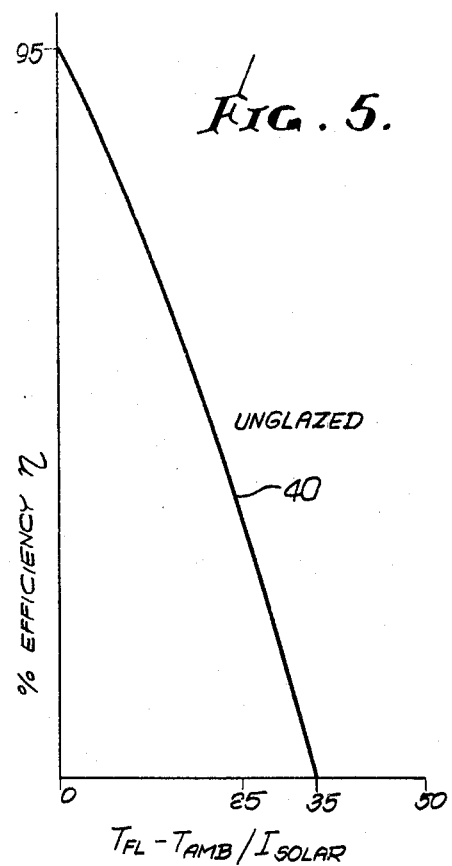
Figure 5A:
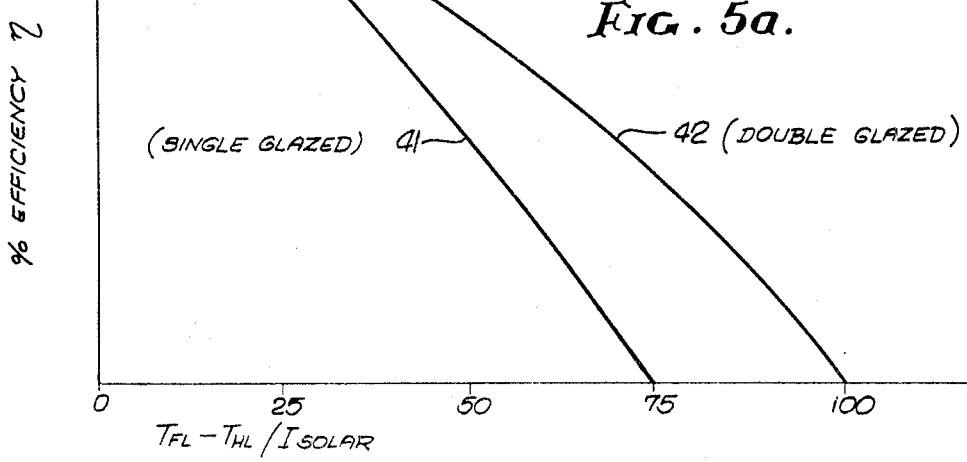

Reference will now be made to FIGS. 5 and 5a and the performance curves shown therein. Curve 40 in FIG. 5 represents the typical performance of an unglazed flat plate solar collector as seen in FIG. 1, but which lacks the sheet 23 with its channels 24, such performance indicated in terms of % efficiency $\eta$ plotted against $(T_{FL} - T_{AMB})/I_{solar}$, where $T_{FL}$ = average temperature of collector liquid flowing within stretches 16 i.e.

$$\left(\frac{T_{in} + T_{out}}{2}\right)$$

$T_{AMB}$ = ambient temperature at the solar radiation inlet side 13 of the enclosure $I_{solar}$ = solar flux i.e. the solar flux characteristic of a given day.

$I_{solar}$ = calories/cm$^2$/minute.

In this regard, it will be noted that as the difference between $T_{FL}$ and $T_{AMB}$ decreases, the efficiency increases.

Curve 41 represents the performance of a single glazed collector seen in FIG. 1, and inclusive of sheet 23 filled with transparent liquid. Accordingly, in FIG. 5a efficiency $\eta$ is plotted against $(T_{FL} - T_{HW})/I_{Solar}$ where $T_{FL}$ is the same as above $T_{HL}$ = temperature of the hot fluid flowing in sheet 23 (or in two such sheets as in FIG. 4)

$I_{solar}$ = same as above

Here, it will be noted that for a given efficiency (horizontal lines in FIGS. 5 and 5a) a higher value of $(T_{FL} - T_{HL})$ is obtainable using the collector of FIG. 1 that includes sheet 23 as compared with the value $(T_{FL} - T_{AMB})$ using the collector without sheet 23. This in turn means that a significantly higher $T_{FL}$ value, i.e. outflow liquid temperature, can be obtained by employing the sheet 23. Alternatively, for the same $(T_{FL} - T_{HL})$ value, a higher efficiency can be obtained.

In one example, the efficiency of an "unglazed" collector (i.e. a collector as in FIG. 1, but without sheet 23) is approximately represented by the straight line equation:

$$\eta = 0.95 - .0264 \left(\frac{T_{FL} - T_{AMB}}{I_o}\right) \quad (1)$$

The efficiency of a "singled glazed" collector (i.e. a collector as in FIG. 1) is approximately represented by the straight line equation:

$$\eta = 0.85 - .012 \left(\frac{T_{FL} - T_{HL}}{I_o}\right) \quad (2)$$

where $I_o \cong 1.2$ calories/cm$^2$/minute. $I_o$ varies during the day.

For a raised temperature $T_{HL}$ equal to 56° C., and for 60% efficiency, $T_{FL}$ in equation (2) is 81° C.

FIG. 4 shows a collector the same as in FIG. 1, but including a "double glazed" construction i.e. employing a second sheet like sheet 23, but indicated at 123. The input 133a to the channels in sheet 123 is here connected to a side stream taken from the output from the ducting 17, 16 and 18 in the collector, at temperature $T_{FL}$, which acts to further raise the temperature $T_{HL}$ at side 13 of the collector. The curve or "line" representing this performance condition is seen at 42 in FIG. 5a. The efficiency of the double glazed collector in FIG. 4 is now approximately represented by the equation:

$$\eta = 0.78 - .0078 \left(\frac{T_{FL} - 81° C.}{I_o}\right) \quad (3)$$

where $I_o \cong 1.2$ calories/cm$^2$/minute

For a 60% efficiency condition, $\eta = 0.60$ and $T_{FL} = 108.6°$ C. Clearly, the temperature of the outflow liquid is significantly raised again, and indeed the production of steam can be realized where the liquid used is water.

FIG. 6a illustrates a series of collectors each as shown in FIG. 1. Waste heat is fed at 149 to each collector 20. The heated output at 20 from each collector 11 is fed to the sheet 23 of the next collector in the series; and the temperatures of the outputs from the collectors increases, i.e. $T_3 > T_2 > T_1$. This arrangement is characterized as cascaded. Very hot output appears at 20a.

Figure 6B:
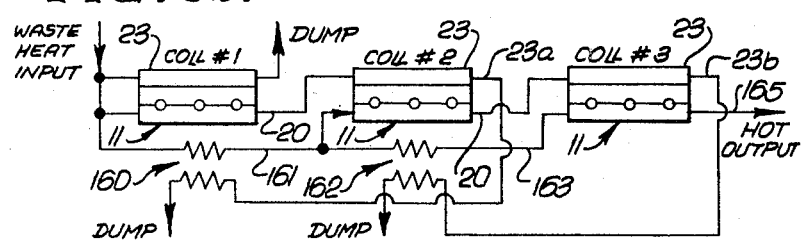

FIG. 6b is like FIG. 6a, except that the output 23a from sheet 23 of collector #2 is fed to a heat exchanger 160 to add heat to waste heated fluid passing at 161 to the second and third collectors; and the output 23b from sheet 23 of collector #3 is fed to a heat exchanger 162 to add heat to waste heated fluid passing at 163 to the third collector. Very hot output is discharged at 165. Other cascaded variations employing the invention are also possible.

In the above, it will be noted that $T_{amb}$ is replaced by $T_{waste\ heat}$. Therefore, since $T_{waste\ heat} > T_{amb}$, and since efficiency $\eta$ is given by $$\eta = A - B\left(\frac{T_{fluid} - T_{amb}}{T_o}\right),$$

the replacement of $T_{amb}$ by a relatively larger number or value (i.e. $T_{waste\ heat}$) reduces the magnitude of the term in brackets, thus increasing efficiency, $\eta$.

FIG. 9 shows a unitary solar apparatus comprising a first means (as at 50) forming a first series of channels 51 located in side-by-side relation, but with dividers 52 between such channels. The latter pass a first fluid to be heated. A source for such fluid appears at 53. Also provided is means (as at 54) forming a second series of channels 55 located in side-by-side relation, but with dividers 56 between such channels. The latter pass a heated second fluid (corresponding to fluid at 33a in FIG. 2). A source for such fluid appears at 57. The means 54 is transparent to solar radiation 58, and is located to pass radiation toward the means 50. Darkened surface extent (as at 59) is associated with the means 50, and may be located at the upper or lower sides of the means 50. Insulation 60 is located below the means 50, and an air gap 61 is located between the means 50 and 54. Ribs 62 may connect the means 50 and 54. The apparatus of FIG. 9 may be formed as a coextruded, synthetic plastic unit or structure.

I claim:

1. In a solar apparatus, the combination comprising
   (a) a solar collector having a side through which solar radiation enters the collector, and
   (b) first means operable to raise the ambient temperature at said side and through which solar radiation may pass, said first means defining transparent channel structure, said first means including supply means supplying relatively hot first liquid flowing through said channel structure, said first liquid being translucent or transparent, and having been preliminarily heated by waste heat,
   (c) the collector including heat absorbing ducting located to receive impingement of solar radiation that has passed through said channel structure and first liquid, and
   (d) second means to supply second liquid at a lower temperature than that of the first liquid to flow through said ducting, to be heated therein to a temperature higher than that of said first liquid.

2. The combination of claim 1 wherein said first means includes a transparent sheet extending at said side of the collector, said sheet defining said channel structure.

3. The combination of claim 2 including said first liquid which has been heated by waste heat, said first liquid flowing through said channel structure.

4. The combination of claim 1 including a source of waste heat transferring heat to said first liquid that subsequently flows through said channel structure.

5. The combination of claim 3 including a source of waste heat transferring heat to said first liquid that subsequently flows through said channel structure.

6. The combination of claim 2 wherein said channel structure includes a plurality of parallel channels in said sheet, said sheet extending crosswise of said collector side, in the path of solar radiation entering said collector.

7. The combination of claim 6 including heat insulation means extending about the collector excepting at said side.

8. The combination that includes two solar collectors as defined in claim 1, said collectors connected in intercommunicating relation such that said first liquid flowing through the channel structure at one collector also flows through the other collector to be heated thereby prior to its passage through the one collector.

9. The combination that includes two solar collectors as defined in claim 1, said channel structure associated with one collector operatively connected to said ducting associated with the other collector such that the channel structure associated with said one collector receives the liquid that has passed through the ducting associated with the other collector to be preliminarily heated in said ducting.

10. The combination of claim 2 wherein said sheet consists of transparent plastic and contains multiple parallel channels separated by thin webs, said sheet covering said collector side.

11. The combination of claim 10 wherein the collector includes an enclosure which is insulated on all sides excepting at said side covered by said sheet.

12. The combination of claim 2 including a second transparent sheet like said first sheet and also extending at said side of the collector in overlying relation to the first mentioned sheet, and other supply means to supply other relatively hot liquid to flow through the second sheet channel structure, whereby the temperature of said second liquid is significantly raised to a higher level than would prevail in the absence of said second sheet.

13. The combination of claim 8 including a heat exchanger connected to receive the media discharging from the channel structure of said one collector, there being means flowing fluid via the heat exchanger to said one collector to be heated therein and discharged, the fluid being heated in said heat exchanger.

14. In solar apparatus, the combination comprising
   (a) a solar collector having a side through which solar radiation enters the collector,
   (b) first means operable to raise the ambient temperature at said side and through which solar radiation may pass, said first means defining transparent channel structure, said first means including supply means supplying relatively hot first liquid flowing through said channel structure, said first liquid being translucent or transparent and having been preliminarily heated by waste heat,
   (c) the collector including heat absorbing ducting located to receive impingement of solar radiation that has passed through said channel structure and first liquid, and
   (d) second means to supply second liquid to flow through said ducting, to be heated therein to a temperature higher than that of said first liquid.

* * * * *